United States Patent [19]

Grebennikov

[11] Patent Number: 5,291,950

[45] Date of Patent: Mar. 8, 1994

[54] METHOD OF WELL TREATMENT

[75] Inventor: Valentin Grebennikov, Moscow, Russian Federation

[73] Assignee: Petrosakh U.S.A., Dallas, Tex.

[21] Appl. No.: 936,933

[22] Filed: Aug. 27, 1992

[51] Int. Cl.$^5$ ............................................. E21B 43/27
[52] U.S. Cl. ................................... 166/307; 166/312; 252/8.553
[58] Field of Search ............... 166/271, 273, 307, 312, 166/305.1; 252/8.551, 8.552, 8.553

[56] References Cited

U.S. PATENT DOCUMENTS

| | | | |
|---|---|---|---|
| H475 | 6/1988 | Lawson et al. | 166/270 |
| 2,161,085 | 6/1939 | Phalen | 166/307 X |
| 2,336,714 | 12/1943 | Butler et al. | 166/307 |
| 2,679,294 | 5/1954 | Bond et al. | 166/307 |
| 3,111,984 | 11/1963 | Reisberg . | |
| 3,111,985 | 11/1963 | Reisberg . | |
| 3,482,636 | 12/1969 | Crowe | 166/307 |
| 3,528,503 | 9/1970 | Crowe | 166/307 X |
| 3,688,829 | 9/1972 | Jones | 166/307 X |
| 3,870,668 | 3/1975 | Fischer et al. . | |
| 3,915,233 | 10/1975 | Slusser | 166/307 |
| 3,917,536 | 11/1975 | Crowe | 166/307 X |
| 4,090,563 | 5/1978 | Lybarger et al. | 166/307 |
| 4,120,356 | 10/1978 | Meister | 166/267 |
| 4,215,001 | 7/1980 | Elphingstone et al. | 166/307 X |
| 4,231,882 | 11/1980 | Elphingstone et al. | 166/307 X |
| 4,237,974 | 12/1980 | Scherubel | 166/281 |
| 4,279,305 | 7/1981 | Knapp et al. | 166/307 |
| 4,280,560 | 7/1981 | Sydansk | 166/305.1 |
| 4,289,951 | 9/1981 | Sydansk et al. | 166/281 |
| 4,493,371 | 1/1985 | Reisberg et al. | 166/274 |
| 4,519,455 | 5/1985 | Holtmyer et al. | 166/305.1 |
| 4,526,231 | 7/1985 | Radke | 166/270 |
| 4,531,586 | 7/1985 | McMillen | 166/305.1 |
| 4,541,488 | 9/1985 | Gomory et al. | 166/307 |
| 4,560,003 | 12/1985 | McMillen et al. | 166/305.1 |
| 4,572,297 | 2/1986 | Thigpen, Jr. et al. | 166/307 |
| 4,605,068 | 8/1986 | Young et al. | 166/307 |
| 4,624,314 | 11/1986 | Clark | 166/271 |
| 4,659,811 | 4/1987 | Wu | 252/8.551 X |
| 4,695,389 | 9/1987 | Kubala | 166/307 X |
| 4,815,537 | 3/1989 | Jones | 166/270 |
| 4,817,715 | 4/1989 | Peru | 166/266 |
| 4,846,981 | 7/1989 | Brost | 166/312 X |

Primary Examiner—George A. Suchfield
Attorney, Agent, or Firm—Head & Johnson

[57] ABSTRACT

A method of well treatment designed to enhance recovery of resources from the well. A solution with an alkaline pH greater than 8 is introduced into the well and allowed to react in the well for at least a minimum period of time. A neutral solution with a pH near 7 is introduced into the well and allowed to remain in the well for at least a minimum period of time. Finally, a solution with an acidic pH of approximately 1 is introduced into the well and allowed to react in the well for at least a minimum period of time.

26 Claims, No Drawings

METHOD OF WELL TREATMENT

BACKGROUND OF THE INVENTION

1. Field of the Invention

The present invention is useful in the mineral resources industry as a method of reagent treatment of a well which is used for the recovery of any mineral resources (hydrocarbons; drinking, thermal and industrial water; or mineralized solutions) from the productive zone. This method involves the removal of clogging materials and the increase of the permeability of the rocks which make up the productive zone.

2. Prior Art

In industry practice, many methods of reagent treatment of wells are known which involve the injection of solutions of acid, alkali, and mixtures of salts of various acids, that react with the rocks and clogging material of different origins. See for example Sydansk (U.S. Pat. No. 4,280,560), Holtmyer (U.S. Pat. No. 4,519,455), McMillen (U.S. Pat. No. 4,531,586), Le Ribault (U.S. Pat. No 4,553,597), McMillen (U.S. Pat. No. 4,560,003), Knox (U.S. Pat. No. 3,374,835) and Slusser (U.S. Pat. No. 3,915,223).

Physio-chemical methods of maintaining reservoir pressure, based on the injection of various solutions into the reservoir (acid, alkali, polymer, surfactant and others), are widely used for increasing oil recovery from the productive horizon during the later stages of production of the field. In Peru (U.S. Pat. No. 4,817,715), a solution of sodium bicarbonate with a 0.25 percent to 5 percent concentration is injected in the layer through an injection well and the displaced oil is recovered from a well located nearby.

In order to increase oil recovery in Reisberg (U.S. Pat. No. 3,111,985), an acidic napthene solution based on kerosene is injected into the reservoir, followed by the injection of a sodium hydroxide solution in a concentration of 0.1 percent. This solution neutralizes the acidic solution and acts as a displacement agent.

Polymictic gel, used in Elphingstone et al. (U.S. Pat. No. 4,215,001), and having thixotropic properties, is injected in the layer to react on the fractures of the near-well zone. This gel is prepared by mixing acidic solutions based on hydrochloric, phosphoric and sulfuric acid or their mixture with sodium oxide and silicium.

Gomory et al (U.S. Pat. No. 4,541,488) is used for the dissolution of calcium and iron clogging compounds in the perforated zone of water wells. A weak acidic solution (acetic, tartaric, citric, metaboric, tetraboric) is injected into the layer and retained in the well for ten to 48 hours. After that, the weak acidic solution is pumped out of the well. Then a sodium bicarbonate and/or sodium hydrochloride solution is injected and retained for one to 36 hours. Thereafter, the well is flushed out.

However, none of the above-mentioned processes effectively reacts in the necessary measure on the argillaceous clogging materials of natural or external origin or on the permeability of the productive horizon.

The purpose of this invention is to develop a technology which permits a positive reaction on the clogging materials and on the permeability of the near-well zone causing an increase in the productivity of wells producing hydrocarbons, drinking, thermal and industrial water, mineralized and other solutions.

SUMMARY OF THE INVENTION

The method of the present invention is accomplished by reagent treatment of a well used for the recovery of various mineral resources (hydrocarbons, drinking, thermal and industrial water, mineralized solutions) of the productive horizon. This process involves the successive injection of several reagent solutions into the productive layer with each individual solution being separated by a neutral solution.

The first stage of this process involves the injection of solutions in the following order: 1) initially, a reagent solution with an alkaline (pH > 8) or acidic (pH ≈ 1) pH value is injected; 2) after which the solution is left in the well for not less than four hours (preferably 4–8 hours); 3) then a solution with pH close to neutral (pH ≈ 7) is injected into the well and retained for not less than two hours (preferably 2–4 hours); 4) then the technical process in points 1–3 can be repeated. The second stage of this process involves the following: the operations from the first stage are repeated, but with a base reagent solution, which has a pH value opposite to the one used in the first stage. The third stage of this process involves pumping the reagent solutions and reservoir fluid out until the flow of fluid from the reservoir is of constant composition.

As an alternative, it is also possible to remove the reagent and neutral solutions prior to injection of the subsequent solutions.

In the first stage, a solution with an alkaline pH is injected into the near-well zone in order to remove the kaolinite clogging materials and/or their mixture with clays of different mineralogical composition.

Alternatively, it is possible to begin the first stage, wherein a solution with an acidic pH is injected into the near-well zone in order to remove montmorillonite clogging materials and/or their mixture with clays of different mineralogical composition.

Solutions with an alkaline pH are prepared with potassium bicarbonate ($KHCO_3$), sodium bicarbonate ($NaHCO_3$) and/or ammonium bicarbonate ($NH_4HCO_3$). These solutions effectively react with the argillaceous materials that were deposited in the near-well zone both as a process of sedimentation and by fluids used in drilling and completing the well. These solutions also effectively react with the argillaceous cement of the productive horizons.

For the preparation of solutions with an acidic pH, sodium bisulfate ($NaHSO_4$), potassium pyrosulphate ($K_2S_2O_7$), sodium pyrosulphate ($Na_2S_2O_7$); and/or ammonium peroxydisulfate (($NH_4)_2S_2O_8$) are used. These solutions also effectively destroy the argillaceous materials regardless of their origin. In addition, these reagent solutions effectively dissolve iron clogging material.

An anionic surfactant of a 0.2 percent to 0.8 percent concentration by weight is added to the alkaline pH solutions. A cationic surfactant of a 0.4 percent to 1.5 percent concentration by weight is added to the acidic pH solutions. An a surfactant of a 0.5 percent to 2 percent concentration by weight is added to solutions with pH values close to neutral.

An important concept in this invention is the transfer of an alkaline (pH > 8) or acidic (pH ≈ 1) to a neutral pH agent (pH ≈ 7) and then to the opposite pH value. Following each alkaline (pH > 8) or acidic (pH ≈ 1) pH agent, there is a transfer to a neutral pH value (pH ≈ 7). The order of treatment by solutions with different pH values is determined by the mineralogical composition of the argillaceous clogging material and the presence of iron compound clogging materials.

DETAILED DESCRIPTION OF THE PREFERRED PROCESSES

This invention, based on experimentally established fact, proves that changing the pH value of an alkaline (pH>8) pH agent to acidic (pH≈1) or changing pH value of an acidic (pH≈1) pH agent to an alkaline (pH>8) in the near-well zone leads to a sharp loss of stability in the aggregate structure of argillaceous material. It also proves that neutralizing the alkaline and acidic agents in the near-well zone activates the process of stability loss of the aggregate structure. This process, as a whole, leads to the complete reconstruction of the structure of the argillaceous materials, by transferring them to a pelitic phase, in which the grains practically do not stick together and are easily removed during the subsequent production of the well. An important result of this treatment is the intensification of the process of leaching of the aluminosilicate from the structure of the argillaceous minerals. This treatment also effectively dissolves iron clogging materials.

The mineralogical composition of the argillaceous clogging materials and the cement of the productive zone should be evaluated in order to successfully apply this invention. The mineralogical composition of the clogging materials in the zone to be treated is determined by analyzing the composition of the clays used in the preparation of circulating or drilling fluid, the argillaceous materials overlying the productive horizon and the argillaceous materials in the interstratification of the productive horizon. Data on mineralogical composition of the clogging materials gathered from the analysis of the circulation or drilling fluid, collected during circulation of the fluid during drilling of the productive horizon, is reliable. The argillaceous component of the productive horizon is determined by the results of analysis of the mineralogical composition of the core or drill cuttings of the productive horizon.

The method of well treatment is conducted in the following manner:

A) Reagent solutions are injected into the productive horizon in the following order.
  1. Initially a base reagent solution with an alkaline (pH>8) or acidic (pH≈1) pH is injected into the well and left to react for not less than four hours (preferably four to eight hours). Chemical compounds are used in the preparation of solutions with alkaline (pH>8) or acidic (pH≈1) pH values depending on their solubility under various thermal and pressure conditions. In addition, an appropriate concentration of surfactant may be added to the solution. The concentration of surfactant that is used is determined by industry practice.
  2. Then a solution with a pH close to neutral (pH≈7) is injected into the productive horizon. This solution may contain a surfactant of a concentration of 0.5 percent to 2 percent by weight. The change in pH from alkaline or acidic to neutral activates the process of destruction of the argillaceous clogging materials. The neutral (pH≈7) pH solution is retained for not less than two hours (preferably two to four hours).
  3. The process in points 1 through 3 can be repeated.

B) The process in Part A is then repeated, but with a base reagent solution with an opposite pH value to the one that was used in Part A is used.

C) The reagent solutions and the reservoir fluid are pumped out of the well until all of the reagent solution and clogging material are extracted and the flow of fluid from the reservoir is of constant composition. This may be accomplished by flowing the well, or artificially lifting the solutions from the well, for example, by swabbing systems. As an alternative, removal of the product of the reaction products and solutions can also be performed after each stage of treatment.

REAGENTS USED IN THE PREPARATION OF SOLUTIONS

Alkaline Solutions
Potassium bicarbonate ($KHCO_3$)
Sodium bicarbonate ($NaHCO_4$)
Ammonium bicarbonate ($NH_4HCO_3$)
Acidic Solutions
Sodium bisulfate ($NaHSO_4$)
Potassium pyrosulphate ($K_2S_2O_7$)
Sodium pyrosulphate ($Na_2S_2O_7$)
Ammonium peroxydisulphate ($(NH_4)_2S_2O_8$)

Surfactants compatible with the chemicals and fluids used for preparing the treatment solutions may be added to each of the solutions.

The order of change of the various values of the pH agent in the productive horizon can be done by the following eight methods:

1. $pH > 8 \rightarrow pH \approx 7 \rightarrow pH > 8 \rightarrow pH \approx 7 \rightarrow pH \approx 1 \rightarrow pH \approx 7 \rightarrow pH \approx 1$ 2. $pH \approx 1 \rightarrow pH \approx 7 \rightarrow pH \approx 1 \rightarrow pH \approx 7 \rightarrow pH > 8 \rightarrow pH \approx 7 \rightarrow pH > 8$ 3. $pH > 8 \rightarrow pH \approx 7 \rightarrow pH \approx 1 \rightarrow pH \approx 7 \rightarrow pH > 8 \rightarrow pH \approx 7 \rightarrow pH \approx 1$ 4. $pH \approx 1 \rightarrow pH \approx 7 \rightarrow pH > 8 \rightarrow pH \approx 7 \rightarrow pH \approx 1 \rightarrow pH \approx 7 \rightarrow pH > 8$ 5. $pH > 8 \rightarrow pH \approx 7 \rightarrow pH \approx 1 \rightarrow pH \approx 7 \rightarrow pH \approx 1 \rightarrow pH \approx 7 \rightarrow pH > 8$ 6. $pH \approx 1 \rightarrow pH \approx 7 \rightarrow pH > 8 \rightarrow pH \approx 7 \rightarrow pH > 8 \rightarrow pH \approx 7 \rightarrow pH \approx 1$ 7. $pH > 8 \rightarrow pH \approx 7 \rightarrow pH \approx 1$ 8. $pH \approx 1 \rightarrow pH \approx 7 \rightarrow pH > 8$ The alkaline (pH>8) and acidic (pH≈1) reagents previously mentioned actively react with the argillaceous materials.

Preferably, the solutions in this process are prepared from reservoir water. Fresh water may also be used. In all cases, compatibility tests of the water, reagents, and surfactant must be made. Additionally, the influence of these solutions on the matrix of the horizon has to be determined. Further consideration should be given to the density of the solution to be injected as it pertains to the techniques of removing the solution from the formation.

The pH sequence of the injected solutions is determined by the type of clay or argillaceous material present. The well is initially treated with solutions with a pH opposite (polar) to the natural conditions under which the clay material was formed. Montmorillonite and chlorite are formed under alkaline conditions so they are treated first with acidic solutions. The reverse is true for kaolinite.

The first stage of treatments results in the loosening of and destruction of coagulational and interphase contacts between clay aggregates and their structural rearrangement. Simultaneously, leaching of aluminosilicates from the clay minerals lattice promotes destruction of clays.

Subsequent injection of fluids with opposite pH values provides major changes in the aggregate structure of the clay transforming them into a finely dispersed pelitic phase that is easily removed from the reservoir. Again, simultaneous, leaching of aluminosilicates is occurring.

Injection of neutral solutions between reagent solutions activates the destruction of the aggregate structure of the clay and removes the reaction products from the surface of the clay and open pores. This also prepares the clay surface for the interaction with subsequent injected solutions. The neutral solution prevents contact between the solutions with opposite pH values which would result in neutralization and solid phase destruction.

The chemical conversions in the composition of the argillaceous materials as well as in the original solution are confirmed by the results of research by the electron spectrophotometer, x-ray analysis, chromatographic analysis and photocolorimetry.

The process that allows for the destruction of argillaceous formations also provides for the effective dissolution of iron clogging materials. This is accomplished by the use of water-based solutions of oxygen-containing compounds of sulfur, which also provides for the effective dissolution of iron clogging materials.

The experimental evaluation of the reagent reaction's effect on the permeability of samples of sandy rock was conducted in laboratory controlled conditions, which can simulate reservoir conditions (medium, pressure, temperature).

Sandstone samples for testing were taken from various fields in the Shirotnoye Priob'ya region and the Urengoi field in the Tyumen province of the Russian Federation (Table 1).

TABLE 1

| Sample No. | Area | Well No. | Interval of Core Sample (in meters) |
| --- | --- | --- | --- |
| 1 | Vat'-Egansk | 160 | 2378–2388 |
| 2 | Vat'-Egansk | 160 | 2378–2388 |
| 3 | Povkhovsk | 751 | 2686–2692 |
| 4 | Povkhovsk | 751 | 2686–2692 |
| 5 | Yakhinsk | P-56 | 3183–3189 |
| 6 | Vostochno-Urengoi | P-314 | 3343–3355 |
| 7 | Severo-Esetinsk | P-207 | 3357–3371 |
| 8 | Severo-Esetinsk | P-207 | 3357–3371 |

In samples 1 through 4, the argillaceous component of the sandstone is composed of kaolinite. The treatment of the sandstone samples was conducted in accordance to the process specified by this invention. The alkaline pH solution used has an 8 percent concentration by weight of ammonium bicarbonate. The acidic pH solution used has a 10 percent concentration by weight of sodium bisulfate.

The results of the testing are shown in Table 2.

TABLE 2

| | Permeability coefficient, mD | | | | | | | | |
| --- | --- | --- | --- | --- | --- | --- | --- | --- | --- |
| | | After treatment with solutions of the following pH values | | | | | | | Increase in |
| Sample No. | Initial | pH = 8.85 | pH = 7.05 | pH = 8.72 | pH = 6.68 | pH = 0.95 | pH = 7.12 | pH = 0.98 | permeability, times |
| 1 | 24 | 52 | — | 75 | — | 81 | — | 90 | 3.7 |
| 2 | 20 | 48 | — | 67 | — | 79 | — | 85 | 4.2 |
| 3 | 97 | 152 | — | 300 | — | 413 | — | 490 | 5.0 |
| 4 | 81 | 164 | — | 187 | — | 225 | — | 302 | 3.7 |

In samples 5 through 8, the argillaceous component of the sandstone is composed of montmorillonite, illite, halloysite. Sodium pyrosulfate (10 percent concentration by weight) was used to prepare the solution with an acidic pH. Potassium bicarbonate (7 percent concentration by weight) was used to prepare the solution with an alkaline pH.

The results of the testing are shown in Table 3.

TABLE 3

| | Permeability coefficient, mD | | | | | | | | |
| --- | --- | --- | --- | --- | --- | --- | --- | --- | --- |
| | | After treatment with solutions of the following pH values | | | | | | | Increase in |
| Sample No. | Initial | pH = 1.05 | pH = 6.95 | pH = 1.05 | pH = 6.95 | pH = 8.9 | pH = 6.95 | pH = 8.9 | permeability, times |
| 5 | 0.3 | 0.6 | — | 1.1 | — | 1.2 | — | 1.4 | 4.6 |
| 6 | 0.2 | 0.4 | — | 0.5 | — | 0.7 | — | 0.7 | 3.5 |
| 7 | 1.0 | 1.1 | — | 2.3 | — | 2.5 | — | 2.8 | 2.8 |
| 8 | 0.6 | 0.7 | — | 0.9 | — | 1.3 | — | 1.5 | 2.5 |

As seen from the data presented above, the average increase in permeability of the samples, resulting from the removal of argillaceous materials, is over 275 percent.

This invention is described in detail for specialists working on increasing the recovery of hydrocarbons, drinking, thermal, and industrial water and mineralized solutions through the removal of clogging materials from the zone. It will be recognized that modifications may be made within the scope of the invention. Variants of the preferred execution of this invention are described in examples.

The wells of the Shirtonogo Priob'ya Region from the Surgut and Nizhnevartovsk anticlines were used for experimental work on the technology of the reagent treatment of the near-well zone by this process. In this area, the oil and gas producing horizons are in the Jurassic (Tyumensk suite) and lower Cretaceous (Megionsk and Vartovsk sites). These reservoirs are present at depths from 1800 m to 2900 m and are porous sandstone. The sandstone is mainly fine-grained, less commonly medium-grained, and is composed primarily of feldspar with quartz, and occasionally of quartz with feldspar and polymictic composition. The mineralogical composition of the sandstone cement is predominantly clays containing illitic kaolinite, and calcitic montmorillonite. The open porosity of the sandstone on average decreases with depth from 27 percent to 9 percent. The permeability is 0.8 mD to 500 mD. The density of the reservoir oil is 0.637–0.906 gm/cc, the reservoir pressure varies from 16 to 29 MPa, and the reservoir temperature is from 158° to 212° F.

EXAMPLE 1

Well Number 146, cluster number 12 of the Vatinsk Field was chosen for illustration of the process of this invention. The diameter of the casing is 140 mm, the depth is 1788 m and the net thickness of the pay zone is 6 m. The production of the well before treatment was 6 metric ton/day of liquid, of which 0.6 metric ton/day of was oil.

Tubing was run into the well to a depth of 1784 m. The well was flushed with a volume of reservoir water not less than two times the volume of the borehole. Five cubic meters (5 m$^3$) of a solution of sodium bicarbonate of a 10 percent concentration by weight with an addition of anionic-active surfactant (0.8 percent concentration by weight) was prepared. The pH of the solution was 8.9.

This solution was prepared from a chemical powder reagent in the following manner.

A measured volume of reservoir water was injected into the storage capacity of the pumping unit. In view of the negative temperature of the air ($-59°$ F.), the reservoir water was heated to 113° F. with the help of a mobile steam unit, after which a measured amount of reagent is added. The diffusion of the reagent was conducted through circulation within the storage tank with the help of the pumping unit. After the reagent is diffused, which was visually determined, the pumping unit is connected up to the tubing.

This solution with an alkaline pH was pumped into the perforated zone of the well. Then, the annulus was closed and the alkaline reagent solution was forced into the productive layer by injection of five cubic meters (5 m$^3$) of a solution with a pH close to neutral (pH=7.05). The alkaline solution was left in the well to react for 4.5 hours in the productive horizon.

Further, the solution (in a volume of 5 m$^3$) with a pH agent close to neutral (pH=7.05) and containing a surfactant (0.5 percent concentration), that was used to force the alkaline solution into the near-well zone, was itself injected in the near-well zone. This neutral solution was forced through the near-well zone by another injection of a solution with an alkaline reaction (pH=8.9). The solution with a pH close to neutral (pH=7.05) was left in the layer for 2.5 hours.

After 2.5 hours, five cubic meters (5 m$^3$) of the solution with an alkaline pH (pH=8.9) and containing an addition of a anionic-active surfactant (0.8 percent concentration) was injected in the productive horizon. It was left to react for five hours. The alkaline solution is forced through the productive horizon by another injection of a solution with a pH agent, close to neutral (pH=7.05) and containing a surfactant (0.5 percent concentration).

Then, eight cubic meters (8 m$^3$) of a solution with a neutral pH (pH=7.05) was injected in the near-well zone and is left in this position for two hours. This neutral solution was forced through the layer by the injection of a solution with an acid reaction (pH=0.95) containing an addition of cation-active, surfactant (1.5 percent concentration by weight). The solution, made of sodium bisulfate, (in a volume of 5 m$^3$) was prepared in the storage area of the pumping unit with heating provided by the mobile steam unit to a temperature of 122° F.

After two hours, the solution with the acid reaction was injected into the near-well zone and left to react for four hours. This solution was forced through the near-well zone by the injection of a solution with a neutral reaction (pH$-$7.05).

After four hours, five cubic meters (5 m$^3$) of a solution with an acid reaction (pH=0.95) was injected and left to react for five hours. Reservoir water was used to force the liquid through.

After treatment, the well was flushed and assimilated with the help of a compressor. Well production after treatment was 38.0 tons/day of liquid with 22.8 tons/day being oil. The production of additionally received oil as a result of the introduction of the invention consisted of 22.2 tons/day.

In Table 4, the remaining examples of the application of this invention utilizing various reagent composition is shown.

TABLE 4

| | Composition of Reagents Used | | | |
|---|---|---|---|---|
| Example | Well No./Cluster | Well depth, m | Net pay zone, m | Reagent Used |
| | VATINSK FIELD | | | |
| 2 | 1250/101 | 2735 | 4 | KHCO$_3$, 10% and (NH$_4$)$_2$S$_2$O$_8$, 5% |
| 3 | 118/12 | 1761 | 11 | NaHCO$_3$, 5% and NaHSO$_4$, 5% |
| 4 | 804P/25 | 1969 | 5.5 | KHCO$_3$, 10% and NaHSO$_4$, 5% |
| | SEVERO-POKURSK FIELD | | | |
| 5 | 364/38 | 2376 | 4.0 | NaHCO$_3$, 5% and (NH$_4$)$_2$S$_2$O$_8$, 5% |
| | AGANSK FIELD | | | |
| 6 | 1423/92 | 2430 | 4.0 | NaHCO$_3$, 10% and (NH$_4$)$_2$S$_2$O$_8$, 12% |
| 7 | 565/26 | 2325 | 12 | KHCO$_3$, 5% and NaHSO$_4$, 12% |
| | NOVO-MOLODYEZHNOYE FIELD | | | |
| 8 | 26/15 | 2601 | 1.8 | KHCO$_3$, 8% and |

TABLE 4-continued

| Example | Well No./Cluster | Composition of Reagents Used | | Reagent Used |
|---|---|---|---|---|
| | | Well depth, m | Net pay zone, m | |
| | | | | $(NH_4)_2S_2O_8$, 5% |
| | KONITLORSK FIELD | | | |
| 9 | P-189 | 2506 | 14 | $NH_4HCO_3$, 10% and $NaHSO_4$, 12% |
| | ZAPADNO-SURGUTSK FIELD | | | |
| 10 | 2116/180 | 2872 | 8 | $Na_2S_2O_7$, 7% and $NH_4HCO_3$, 7% |
| 11 | 2010/201 | 2841 | 10 | $K_2S_2O_7$, 5% and $KHCO_3$, 5% |
| 12 | 2036/201 | 2920 | 8 | $NH_4HCO_3$, 5% and $(NH_4)_2S_2O_8$, 12% |

The effective use of this invention is illustrated by the data in Table 5.

TABLE 5

| Example | Well No./Cluster | Before Treatment Liquid | Before Treatment Oil | After Treatment Liquid | After Treatment Oil | Increase in oil, ton/day |
|---|---|---|---|---|---|---|
| 2 | 1250/101 | 32.0 | 27.3 | 48.0 | 41.2 | 13.4 |
| 3 | 118/12 | 3.0 | 2.6 | 72.0 | 18.0 | 15.4 |
| 4 | 804P/25 | 5.0 | 5.0 | 20.0 | 20.0 | 15.0 |
| 5 | 364/38 | 1.7 | 1.0 | 14.0 | 11.8 | 10.8 |
| 6 | 1423/92 | 315.0 | 67.0 | 430.0 | 78.0 | 11.0 |
| 7 | 565/26 | 60.0 | 58.2 | 109.0 | 98.0 | 39.8 |
| 8 | 26/15 | 2.0 | 2.0 | 14.0 | 14.0 | 12.0 |
| 9 | P-189 | 7.5 | 7.5 | 19.8 | 19.8 | 12.3 |
| 10 | 2116/180 | 2.5 | 2.5 | 10.0 | 10.0 | 7.5 |
| 11 | 2010/201 | 10.0 | 10.0 | 36.0 | 36.0 | 26.0 |
| 12 | 2036/201 | 14.8 | 14.8 | 41.8 | 41.8 | 27.0 |

Several conclusions can be made from these industry results. Foremost, this invention permits the increase in the productivity of a productive horizon not only by means of the removal of clogging materials, but also through increasing the permeability of the rocks by means of removing the natural cement of the productive sandstone.

Whereas, the present invention has been described in relation to the various processes herein, it should be understood that other and further modifications, apart from those shown or suggested herein, may be made within the spirit and scope of this invention.

What is claimed is:

1. A method of well treatment designed to enhance recovery of resources from said well, which method comprises:
   a. introducing a base solution with an alkaline (pH>8) pH value into said well and allowing said alkaline solution to react in said well;
   b. introducing a solution with a pH value close to neutral (pH≈7) into said well and allowing said neutral solution to treat the well during a soak or shut-in time period;
   c. introducing a solution with an acidic (pH≈1) pH value into said well and allowing said solution to react in said well; and
   d. introducing a solution with a pH value close to neutral (pH≈7) into said well and allowing said neutral solution to treat the well during a soak or shut-in time period.

2. A method of well treatment as set forth in claim 1 wherein said alkaline solution is a water-based solution having a reagent chosen from a group consisting of sodium bicarbonate ($NaHCO_3$) potassium bicarbonate ($KHCO_3$) and ammonium bicarbonate ($NH_4HCO_3$) in a concentration of 5% to 10%.

3. A method of well treatment as set (pH≈1) forth in claim 1 wherein said solution with an acidic pH value is a water-based solution having a reagent chosen from a group consisting of sodium bisulfate ($NaHSO_4$), potassium pyrosulphate ($K_2S_2O_7$), sodium pyrosulphate ($Na_2S_2O_7$) and ammonium peroxydisulfate (($NH_4)_2S_2O_8$) in a concentration of 5 to 12 percent by weight.

4. A method of well treatment as set forth in claim 1 wherein a surfactant having a concentration of 0.2% to 0.8% is introduced into said alkaline solution (pH>8) for introduction into said well.

5. A method of well treatment as set forth in claim 1 wherein a surfactant having a concentration of 0.5% to 2.0% is introduced into said solution in step b. for introduction into said well.

6. A method of well treatment as set forth in claim 5 wherein said surfactant is also introduced into said solution in step d.

7. A method of well treatment as set forth in claim 1 wherein said alkaline solution is allowed to react in said well for a period of between 4 to 8 hours.

8. A method of well treatment as set forth in claim 7 including the additional step of removing said alkaline solution prior to the next step.

9. A method of well treatment as set forth in claim 1 wherein said neutral solution is allowed to react in said well for a period of between 2 to 4 hours.

10. A method of well treatment as set forth in claim 8 including the additional step of removing said solution in step b. prior to the next step.

11. A method of well treatment as set forth in claim 10 including the additional step of removing the acidic solution prior to the next step.

12. A method of well treatment as set forth in claim 1 wherein said acidic solution is allowed to react in the well for a period of between 4 to 8 hours.

13. A method of well treatment a set forth in claim 1 wherein introduction of said neutral solution in step b. displaces said alkaline solution.

14. A method of well treatment as set forth in claim 1 wherein introduction of said neutral solution in step d. displaces said solution with an acidic pH value.

15. A method of well treatment designed to enhance recovery of resources from said well, which method comprises:
   a. introducing a solution with an acidic (pH≈1) pH value into said well and allowing said solution to react in said well;
   b. introducing a solution with a pH close to neutral (pH≈7) into said well and allowing said neutral solution to treat the well during a soak or shut-in time period;

c. introducing a base solution with an alkaline (pH>8) value into said well and allowing said alkaline solution to react in said well; and d. introducing a solution with a pH value close to neutral (pH≈7) into said well and allowing said neutral solution to treat the well during a soak or shut-in time period.

16. A method of well treatment as set forth in claim 15 wherein said solution with an acidic (pH≈1) pH value is a water-based solution having a reagent chosen from a group consisting of sodium bisulfate ($NaHSO_4$), potassium pyrosulphate ($K_2S_2O_7$), sodium pyrosulphate ($Na_2S_2O_7$) and ammonium peroxydisulfate (($NH_4)_2S_2O_8$) in a concentration of 5 percent to 12 percent by weight.

17. A method of well treatment as set forth in claim 5 wherein said alkaline solution is a water-based solution having a reagent chosen from a group consisting of sodium bicarbonate ($NaHCO_3$), potassium bicarbonate ($KHCO_3$), and ammonium bicarbonate ($NH_4HCO_3$) in a concentration of 5 percent to 10 percent.

18. A method of well treatment as set forth in claim 15 wherein a cation-active surfactant having a concentration of 0.4 percent to 1.5 percent is introduced into said acidic solution for introduction into said well.

19. A method of well treatment as set forth in claim 15 wherein a surfactant having a concentration of 0.5% to 2.0% is introduced into said solution in step b. for introduction into said well.

20. A method of well treatment as set forth in claim 19 wherein said surfactant is also introduced into said solution in step d.

21. A method of well treatment as set forth in claim 15 wherein said acidic solution is allowed to react in said well for a period between 4 to 8 hours.

22. A method of well treatment as set forth in claim 21 including the additional step of removing said acidic solution prior to the next step.

23. A method of well treatment as set forth in claim 15 wherein said neutral solution is allowed to treat the well during a soak or shut in time period of between 2 to 4 hours.

24. A method of well treatment as set forth in claim 23 including the additional step of removing said solution in step b. prior to the next step.

25. A method of well treatment as set forth in claim 15 wherein said alkaline solution is allowed to react in said well for a period of between 4 to 8 hours.

26. A method of well treatment as set forth in claim 25 including the additional step of removing said alkaline solution prior to the next step.

* * * * *